US012772219B2

(12) United States Patent
Wang et al.

(10) Patent No.: US 12,772,219 B2
(45) Date of Patent: Oct. 20, 2026

(54) RESOURCE NEGOTIATION METHOD

(71) Applicant: HUAWEI TECHNOLOGIES CO., LTD., Shenzhen (CN)

(72) Inventors: Rong Wang, Shanghai (CN); Zichen Xie, Shanghai (CN); Cong Cao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 369 days.

(21) Appl. No.: 18/587,272

(22) Filed: Feb. 26, 2024

(65) Prior Publication Data

US 2024/0196382 A1 Jun. 13, 2024

Related U.S. Application Data

(63) Continuation of application No. PCT/CN2021/116776, filed on Sep. 6, 2021.

(51) Int. Cl.
*H04W 72/0446* (2023.01)

(52) U.S. Cl.
CPC ............................... *H04W 72/0446* (2013.01)

(58) Field of Classification Search
None
See application file for complete search history.

(56) References Cited

U.S. PATENT DOCUMENTS

| | | | | |
|---|---|---|---|---|
| 9,710,342 | B1 * | 7/2017 | Weinstein | G06F 11/2005 |
| 2017/0230917 | A1 * | 8/2017 | Ouchi | H04L 5/0055 |
| 2018/0026973 | A1 * | 1/2018 | Le Saint | H04W 12/06 |

FOREIGN PATENT DOCUMENTS

| | | | |
|---|---|---|---|
| CN | 107809770 | A | 3/2018 |
| CN | 109314630 | A | 2/2019 |

OTHER PUBLICATIONS

International Search Report and Written Opinion in International Appln. No. PCT/CN2021/116776, mailed on Apr. 25, 2022, 15 pages (with English Translation).

* cited by examiner

*Primary Examiner* — Robert M Morlan
(74) *Attorney, Agent, or Firm* — Fish & Richardson P.C.

(57) ABSTRACT

This application relates to a resource negotiation method and apparatus, a device, a computer-readable storage medium, and a computer program product. In an example method, a first primary device obtains, through a secondary device, resource allocation information provided by a second primary device. The resource allocation information indicates at least a time resource for transmission from the first primary device or the second primary device to the secondary device. The first primary device determines, in an event periodicity based on the obtained resource allocation information, a first time resource for transmission from the first primary device to the secondary device.

20 Claims, 8 Drawing Sheets

RESOURCE NEGOTIATION METHOD

CROSS-REFERENCE TO RELATED APPLICATIONS

This application is a continuation of International Application No. PCT/CN2021/116776, filed on Sep. 6, 2021, the disclosure of which is hereby incorporated by reference in its entirety.

TECHNICAL FIELD

This application mainly relates to the field of communications, and in particular, to a resource negotiation method and apparatus, a device, a computer-readable storage medium, and a computer program product.

BACKGROUND

With increasingly wide application of consumer electronics, a multi-connectivity scenario emerges to facilitate a user to switch between different devices. In the multi-connectivity scenario, one device is used as a terminal node to connect to a plurality of other devices used as primary nodes. For example, a dual-ear true wireless stereo (TWS) Bluetooth headset may be connected to a plurality of devices such as a mobile phone, a tablet, and a large screen. The headset is used as the terminal node, and the mobile phone, the tablet, and the large screen are used as the primary nodes. In the multi-connectivity scenario, the terminal node needs to be scheduled by different primary nodes. To efficiently use an air interface resource, it needs to be ensured that no conflict occurs when a plurality of primary nodes schedule a same terminal node.

SUMMARY

Embodiments disclosed in this application provide a resource negotiation solution.

A first aspect of this application provides a resource negotiation method. The method is applied to a multi-connectivity scenario. In the multi-connectivity scenario, a first primary device and a second primary device separately control a secondary device. The method includes: The first primary device obtains, through the secondary device, resource allocation information provided by the second primary device, where the resource allocation information indicates at least a time resource for transmission from the first primary device or the second primary device to the secondary device; and the first primary device determines, in an event periodicity based on the resource allocation information, a first time resource for transmission from the first primary device to the secondary device.

In embodiments of the first aspect, resource negotiation between primary nodes is performed in a system including a plurality of primary nodes. In this way, utilization of an air interface resource can be improved. This may also increase a retransmission opportunity of service data, thereby improving system reliability.

In some embodiments of the first aspect, the obtaining resource allocation information includes: The first primary device receives link establishment information from the secondary device, where the link establishment information is used for establishing a link between the first primary device and the second primary device; the first primary device establishes the link with the second primary device based on the link establishment information; and the first primary device receives the resource allocation information from the second primary device through the link. In this way, direct communication between the primary nodes can be implemented, thereby improving efficiency of resource negotiation.

In some embodiments of the first aspect, the method further includes: The first primary device sends, to the secondary device, a first request used for establishing the link, to indicate the secondary device to forward the first request to the second primary device. In this way, a direct link used for negotiation between the primary nodes may be established when needed.

In some embodiments of the first aspect, the resource allocation information indicates a second time resource for transmission from the second primary device to the secondary device. The determining a first time resource includes: The first primary device determines, in the event periodicity based on the second time resource, an idle time resource that does not overlap the second time resource; and the first primary device determines the first time resource based on the idle time resource. In this way, a primary node may independently select, from a remaining time resource, a resource applicable to the primary node.

In some embodiments of the first aspect, the determining the first time resource based on the idle time resource includes: If the idle time resource is insufficient for transmission from the first primary device to the secondary device, the first primary device sends, to the secondary device, a second request for resource negotiation with the second primary device; the first primary device receives a response to the second request from the secondary device, where the response indicates an additional time resource reallocated by the second primary device; and the first primary device determines the first time resource based on the idle time resource and the additional time resource. In this embodiment, when the remaining resource is insufficient, further negotiation may be performed between the primary nodes. In this way, flexibility of resource allocation can be improved, and utilization of the air interface resource can be further improved.

In some embodiments of the first aspect, the method further includes: The first primary device sends, to the secondary device, a message indicating that the first time resource is to be occupied, to update the resource allocation information stored in the secondary device. The update of the resource allocation information enables all the primary nodes to learn air interface resource allocation, to avoid a resource conflict.

In some embodiments of the first aspect, the method further includes: The first primary device receives timing information related to the second primary device from the secondary device; and the first primary device adjusts a local clock of the first primary device based on the timing information, to align with a clock of the second primary device. Clock alignment between the primary nodes helps further improve utilization of the air interface resource and avoid a resource waste to the greatest extent. In addition, the clock alignment also makes resource negotiation between the primary nodes more efficient.

A second aspect of this application provides a resource negotiation method. The method is applied to a multi-connectivity scenario. In the multi-connectivity scenario, a first primary device and a second primary device separately control a secondary device. The method includes: The second primary device determines resource allocation information, where the resource allocation information indicates at least a time resource for transmission from a first primary device or the second primary device to the secondary device; and the second primary device provides the resource allocation information for the first primary device through the secondary device, to indicate the first primary device to determine, in an event periodicity, a first time resource for transmission from the first primary device to the secondary device.

In embodiments of the second aspect, resource negotiation between primary nodes is performed in a system including a plurality of primary nodes. In this way, utilization of an air interface resource can be improved. This may also increase a retransmission opportunity of service data, thereby improving system reliability.

In some embodiments of the second aspect, the providing the resource allocation information for the first primary device includes: The second primary device sends link establishment information to the secondary device, where the link establishment information is used for establishing a link between the first primary device and the second primary device; the second primary device establishes the link with the first primary device based on the link establishment information; and the second primary device sends the resource allocation information to the first primary device through the link. In this way, direct communication between the primary nodes can be implemented, thereby improving efficiency of resource negotiation.

In some embodiments of the second aspect, the sending link establishment information to the secondary device includes: The second primary device receives a first request used for establishing the link from the secondary device; and in response to the first request, the second primary device sends the link establishment information to the secondary device. In this way, a direct link used for negotiation between the primary nodes may be established when needed.

In some embodiments of the second aspect, the providing the resource allocation information for the first primary device includes: sending the resource allocation information to the secondary device, to indicate the secondary device to forward the resource allocation information to the first primary device. In this way, a secondary node may be used for implementing resource negotiation between the primary nodes.

In some embodiments of the second aspect, the resource allocation information indicates a second time resource for transmission from the second primary device to the secondary device. The method further includes: The second primary device receives, from the secondary device, a second request for resource negotiation with the second primary device; and the second primary device sends a response to the second request to the secondary device, where the response indicates an additional time resource reallocated by the second primary device, to indicate the secondary device to forward the additional time resource to the first primary device. In this way, flexibility of resource allocation can be improved, and utilization of the air interface resource can be further improved.

A third aspect of this application provides a resource negotiation method. The method is applied to a multi-connectivity scenario. In the multi-connectivity scenario, a first primary device and a second primary device separately control a secondary device. The method includes: The secondary device receives resource allocation information from the second primary device, where the resource allocation information indicates at least a time resource for transmission from the first primary device or the second primary device to the secondary device; the secondary device stores the resource allocation information; and the secondary device sends the resource allocation information to the first primary device, to indicate the first primary device to determine, in an event periodicity, a first time resource for transmission from the first primary device to the secondary device.

In embodiments of the third aspect, resource negotiation between primary nodes is performed in a system including a plurality of primary nodes. In this way, utilization of an air interface resource can be improved. This may also increase a retransmission opportunity of service data, thereby improving system reliability.

In some embodiments of the third aspect, the resource allocation information indicates a second time resource for transmission from the second primary device to the secondary device. The method further includes: The secondary device receives, from the first primary device, a message indicating that the first time resource is to be occupied; and in response to receiving the message, the secondary device updates the stored resource allocation information to indicate that the first time resource is occupied by the first primary device. The update of the resource allocation information enables all the primary nodes to learn air interface resource allocation, to avoid a resource conflict.

In some embodiments of the third aspect, the method further includes: The secondary device sends timing information related to the second primary device to the first primary device, to enable a clock of the first primary device to be aligned with a clock of the second primary device. Clock alignment between the primary nodes helps further improve utilization of the air interface resource and avoid a resource waste to the greatest extent. In addition, the clock alignment also makes resource negotiation between the primary nodes more efficient.

A fourth aspect of this application provides a resource negotiation apparatus. The apparatus includes an information obtaining unit, configured to obtain, through a secondary device, resource allocation information provided by a second primary device, where the resource allocation information indicates at least a time resource for transmission from a first primary device or the second primary device to the secondary device. The apparatus further includes a resource determining unit, configured to determine, in an event periodicity based on the resource allocation information, a first time resource for transmission from the first primary device to the secondary device.

In some embodiments of the fourth aspect, the information obtaining unit is further configured to: receive link establishment information from the secondary device, where the link establishment information is used for establishing a link between the first primary device and the second primary device; establish the link with the second primary device based on the link establishment information; and receive the resource allocation information from the second primary device through the link.

In some embodiments of the fourth aspect, the apparatus further includes: a first request sending unit, configured to send, to the secondary device, a first request used for establishing the link, to indicate the secondary device to forward the first request to the second primary device.

In some embodiments of the fourth aspect, the information obtaining unit is further configured to receive the resource allocation information obtained by the secondary device from the second primary device and forwarded by the secondary device.

In some embodiments of the fourth aspect, the resource allocation information indicates a second time resource for transmission from the second primary device to the secondary device. The resource determining unit is further configured to: determine, in the event periodicity based on the second time resource, an idle time resource that does not overlap the second time resource; and determine the first time resource based on the idle time resource.

In some embodiments of the fourth aspect, the resource determining unit is further configured to: If the idle time resource is insufficient for transmission from the first primary device to the secondary device, send, to the secondary device, a second request for resource negotiation with the second primary device; receive a response to the second request from the secondary device, where the response indicates an additional time resource reallocated by the second primary device; and determine the first time resource based on the idle time resource and the additional time resource.

In some embodiments of the fourth aspect, the apparatus further includes a message sending unit, configured to send, to the secondary device, a message indicating that the first time resource is to be occupied, to update the resource allocation information stored in the secondary device.

In some embodiments of the fourth aspect, the apparatus further includes: a timing information receiving unit, configured to receive timing information related to the second primary device from the secondary device; and a clock adjusting unit, configured to adjust a local clock of the first primary device based on the timing information, to align with a clock of the second primary device.

A fifth aspect of this application provides a resource negotiation apparatus. The apparatus includes: an information determining unit, configured to determine resource allocation information, where the resource allocation information indicates at least a time resource for transmission from a first primary device or a second primary device to a secondary device; and an information providing unit, configured to provide the resource allocation information for the first primary device through the secondary device, to indicate the first primary device to determine, in an event periodicity, a first time resource for transmission from the first primary device to the secondary device.

In some embodiments of the fifth aspect, the information providing unit is further configured to: send link establishment information to the secondary device, where the link establishment information is used for establishing a link between the first primary device and the second primary device; establish the link with the first primary device based on the link establishment information; and send the resource allocation information to the first primary device through the link.

In some embodiments of the fifth aspect, the information providing unit is further configured to: receive a first request used for establishing the link from the secondary device; and in response to the first request, send the link establishment information to the secondary device.

In some embodiments of the fifth aspect, the information providing unit is further configured to send the resource allocation information to the secondary device, to indicate the secondary device to forward the resource allocation information to the first primary device.

In some embodiments of the fifth aspect, the resource allocation information indicates a second time resource for transmission from the second primary device to the secondary device. The apparatus further includes: a second request receiving unit, configured to receive, from the secondary device, a second request for resource negotiation with the second primary device; and a responding unit, configured to send a response to the second request to the secondary device, where the response indicates an additional time resource reallocated by the second primary device, to indicate the secondary device to forward the additional time resource to the first primary device.

A sixth aspect of this application provides a resource negotiation apparatus. The apparatus includes an information receiving unit, configured to receive resource allocation information from a second primary device, where the resource allocation information indicates at least a time resource for transmission from a first primary device or the second primary device to a secondary device. The apparatus further includes an information storage unit, configured to store the resource allocation information. The apparatus further includes an information sending unit, configured to send the resource allocation information to the first primary device, to indicate the first primary device to determine, in an event periodicity, a first time resource for transmission from the first primary device to the secondary device.

In some embodiments of the sixth aspect, the resource allocation information indicates a second time resource for transmission from the second primary device to the secondary device. The apparatus further includes: a message receiving unit, configured to receive, from the first primary device, a message indicating that the first time resource is to be occupied; and an information updating unit, configured to update, in response to receiving the message, the stored resource allocation information through the secondary device, to indicate that the first time resource is occupied by the first primary device.

In some embodiments of the sixth aspect, the apparatus further includes: a timing information sending unit, configured to send timing information related to the second primary device to the first primary device, to enable a clock of the first primary device to be aligned with a clock of the second primary device.

A seventh aspect of this application provides an electronic device, including at least one processor and at least one memory. The at least one memory is coupled to the at least one processor and stores instructions executed by the at least one processor. When the instructions are executed by the at least one processor, the device is enabled to implement the method in any one of the implementations of the first aspect, the method in any one of the implementations of the second aspect, or the method in any one of the implementations of the third aspect.

An eighth aspect of this application provides a computer-readable storage medium. The computer-readable storage medium stores one or more computer instructions, and the one or more computer instructions are executed by a processor to implement the method in any one of the implementations of the first aspect, the method in any one of the implementations of the second aspect, or the method in any one of the implementations of the third aspect.

A ninth aspect of this application provides a computer program product. When the computer program product runs on a computer, the computer is enabled to perform instructions of some or all steps of the method in any implementation of the first aspect, instructions of some or all steps of the method in any implementation of the second aspect, or instructions of some or all steps of the method in any implementation of the third aspect.

It may be understood that the electronic device in the seventh aspect, the computer storage medium in the eighth aspect, or the computer program product in the ninth aspect is configured to perform the methods provided in the first aspect, the second aspect, and the third aspect. Therefore, explanations or descriptions of the first aspect, the second aspect, and the third aspect are also applicable to the seventh aspect, the eighth aspect, and the ninth aspect. In addition, for beneficial effects that can be achieved in the seventh aspect, the eighth aspect, and the ninth aspect, refer to beneficial effects in corresponding methods. Details are not described herein again.

It should be understood that content described in the summary section is neither intended to limit a key or important feature of embodiments of this application, nor intended to limit the scope of this application. Other features of this application are easy to understand by using the following descriptions.

BRIEF DESCRIPTION OF DRAWINGS

The above and other features, advantages, and aspects of this application become more apparent with reference to the accompanying drawings and the following detailed descriptions. In the accompanying drawings, the same or similar reference numerals indicate the same or similar elements.

DESCRIPTION OF EMBODIMENTS

The following describes embodiments of this application in detail with reference to the accompanying drawings. Although some embodiments of this application are shown in the accompanying drawings, it should be understood that this application may be implemented in various forms, and should not be construed as being limited to embodiments described herein. On the contrary, these embodiments are provided so that this application will be thoroughly and completely understood. It should be understood that the accompanying drawings and embodiments of this application are merely used as examples, but are not intended to limit the protection scope of this application.

In the descriptions of embodiments of this application, the term "include" and similar terms thereof should be understood as open inclusion, that is, "include but not limited to". The term "based on" should be understood as "based at least in part on". The terms "one embodiment" or "the embodiment" should be understood as "at least one embodiment". The terms "first", "second", and the like may indicate different or same objects. The term "and/or" represents at least one of two items associated with the term. For example, "A and/or B" represents A, B, or A and B. Other explicit and implicit definitions may also be included below.

As used in this specification, the term "time resource" refers to any resource used for communication in time domain. The time resource may include a time unit having any suitable length, for example, but not limited to a slot.

As briefly mentioned above, in a multi-connectivity scenario, a terminal node (also referred to as a "secondary node" below) needs to be scheduled by different primary nodes. For example, a TWS Bluetooth headset needs to be scheduled by a device such as a mobile phone, a tablet, and a large screen through Bluetooth connection. However, in a current Bluetooth standard, when the terminal node is connected to a plurality of primary nodes, the terminal node is fully subject to scheduling by the primary nodes, and no air interface resource negotiation is performed between the primary nodes. A dual-connectivity scenario including two primary nodes is used as an example. The two primary nodes separately send data to the terminal node. The primary nodes neither perform air interface resource negotiation nor perform timing alignment between each other. For example, the two primary nodes do not perform slot alignment. In this case, an air interface resource conflict may exist between the two primary nodes.

Figure 1A:
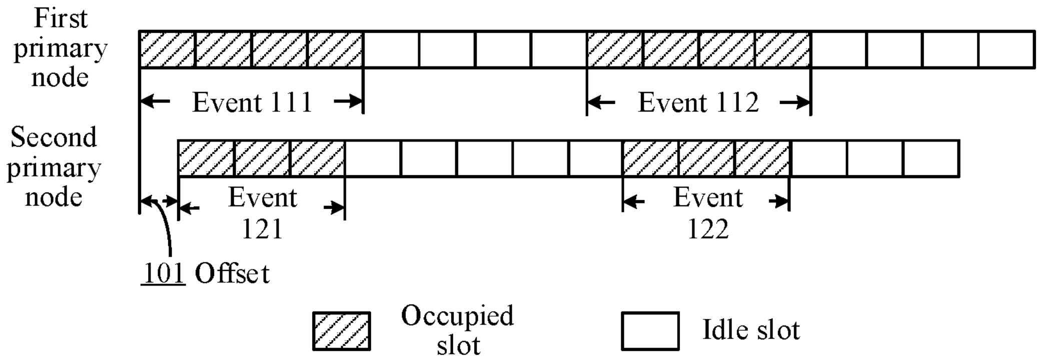
FIG. 1A shows an example of a resource conflict between two primary nodes.

FIG. 1A shows an example of a complete resource conflict between two primary nodes. As shown in FIG. 1A, no timing alignment is performed between a first primary node and a second primary node, and there is an offset 101 between slots. Transmission from the first primary node to a terminal node includes an event 111 and an event 112, and transmission from the second primary node to the terminal node includes an event 121 and an event 122. In this example, a complete conflict exists between air interface resources of the first primary node and the second primary node. To be specific, the event 111 completely conflicts with the event 121, and the event 112 completely conflicts with the event 122. In this case, the terminal node can only perform time-sharing receiving by priority of service events between the primary nodes. The terminal node cannot receive data of a low-priority event.

Figure 1B:
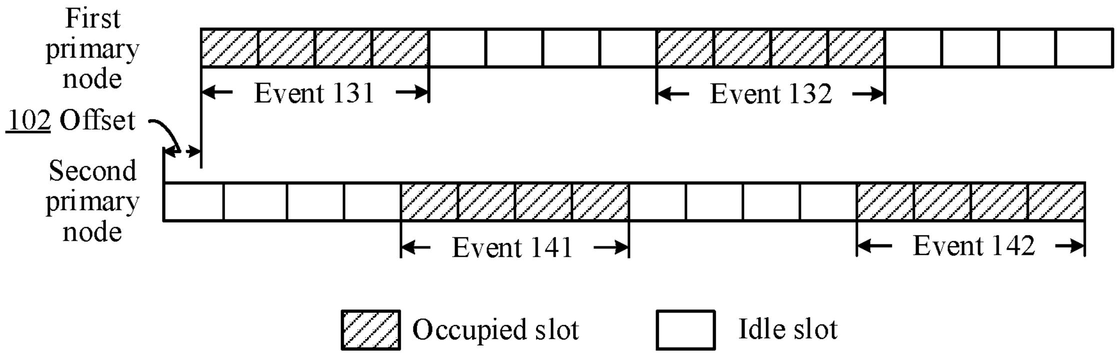
FIG. 1B shows another example of a resource conflict between two primary nodes.

FIG. 1B shows an example of a partial resource conflict between two primary nodes. Because no timing alignment is performed between the first primary node and the second primary node, there is an offset 102 between slots, and a partial conflict exists between air interface resources of the first primary node and the second primary node. To be specific, an event 131 of the first primary node partially conflicts with an event 141 of the second primary node, and an event 132 of the first primary node partially conflicts with an event 142 of the second primary node. Slot misalignment causes a conflict between the event 131 and the event 141 that could have been completely staggered.

In this conventional solution, there is a lack of resource coordination between the primary nodes. An air interface resource conflict exists in events of different primary nodes, and an idle resource is not effectively utilized, thereby causing a waste of an air interface resource. In addition, this also prolongs an event scheduling periodicity. The terminal node can receive data of only one primary node at a time, and data not received may need to be retransmitted. As a result, a scheduling periodicity of the primary node event is prolonged.

To at least partially resolve the foregoing problems and another potential problem, various embodiments of this application provide a solution for resource coordination. In general, the various embodiments described herein are applied to a multi-connectivity scenario. In the multi-connectivity scenario, two or more primary nodes separately control a secondary node. The secondary node serves as a medium for resource negotiation between the primary nodes. The first primary node obtains, through the secondary node, resource allocation information provided by the second primary node. The resource allocation information indicates at least a time resource for transmission from the first primary node or the second primary node to the secondary node. The first primary device determines, in an event periodicity based on the obtained resource allocation information, a first time resource for transmission from the first primary node to the secondary node. In some embodiments, the first primary node and the second primary node establish a link through the secondary node, and directly negotiate resource allocation through the link. In these embodiments, the resource allocation information is received from the second primary node through the link. In some embodiments, the first primary node and the second primary node negotiate resource allocation through the terminal node. In these embodiments, the resource allocation information is forwarded by the secondary node to the first primary node.

In this embodiment of this application, resource negotiation between primary nodes is performed in a system including a plurality of primary nodes. In this way, utilization of the air interface resource is improved. This also increases a retransmission opportunity of service data, thereby improving system reliability. In addition, this manner not only allows more primary devices to access the system, but also allows more concurrent services or more data to be received and sent in the system. That is, in this way, a capability of the system including the plurality of primary nodes may be improved. The improvement of the system capability facilitates coexistence of a plurality of primary devices (for example, a plurality of mobile phones).

The following describes various example embodiments of this application with reference to the accompanying drawings.

Example Environment

Figure 2:
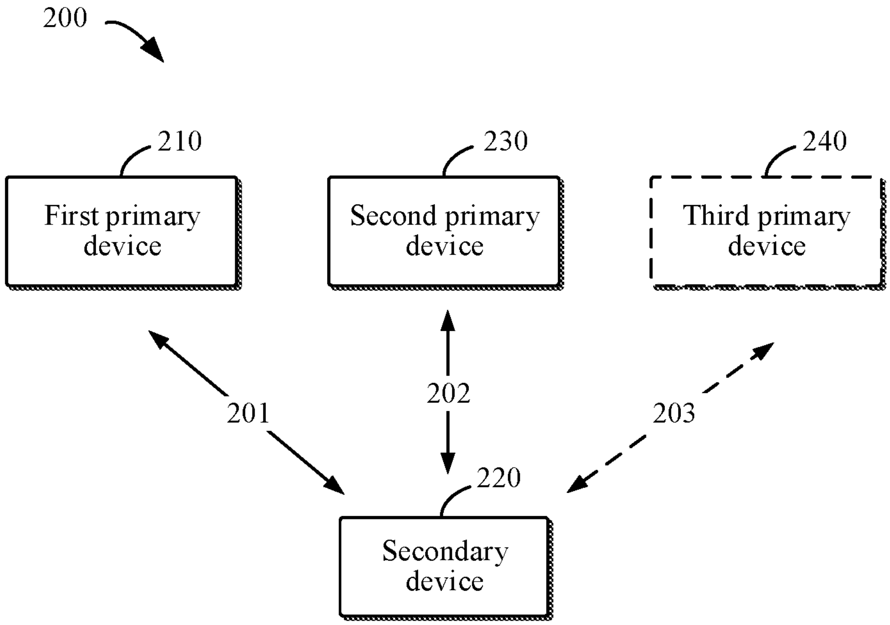
FIG. 2 is a schematic diagram of an example environment in which a plurality of embodiments of this application can be implemented.

FIG. 2 is a schematic diagram of an example environment 200 in which a plurality of embodiments of this application can be implemented. FIG. 2 shows a multi-connectivity scenario in which a plurality of primary devices separately control a secondary device. In general, the example environment 200 includes a first primary device 210, a secondary device 220, and a second primary device 230. The secondary device 220 is controlled by the first primary device 210, and establishes a connection 201 with the first primary device 210. The first primary device 210 and the secondary device 220 may communicate with each other through the connection 201. The secondary device 220 is further controlled by the second primary device 230, and establishes a connection 202 with the second primary device 230. The second primary device 230 and the secondary device 220 may communicate with each other through the connection 202.

In some embodiments, the environment 200 may further include more primary devices, for example, a third primary device 240. In this embodiment, the secondary device 220 is further controlled by the third primary device 240, and communicates with the third primary device 240 through a connection 203. In some embodiments, the secondary device 220 can only receive data from one of the first primary device 210, the second primary device 230, and the third primary device 240 at a time.

The connections 201, 202, and 203 may be any suitable form of wireless connections. For example, the connections 201, 202, and 203 are Bluetooth connections.

In the environment 200, the secondary device 220 serves as a secondary node, and the first primary device 210, the second primary device 230, and the optional third primary device 240 serve as primary nodes. As an example but not intended to limit the scope of this application, the secondary device 220 may be a Bluetooth headset (for example, a TWS Bluetooth headset), and the first primary device 210, the second primary device 230, and the optional third primary device 240 may include one or more of: a smartphone, a smartwatch, a portable computer, a desktop computer, a tablet computer, a large screen, and the like.

It should be understood that the environment 200 shown in FIG. 2 is merely an example, and is not intended to limit the scope of this application. Embodiments of this application may be applicable to an environment including any suitable quantity of devices. For example, such an environment may include more devices as secondary nodes. For another example, a device serving as the secondary node may be controlled by more primary nodes.

Example Process of Resource Negotiation

Figure 3:
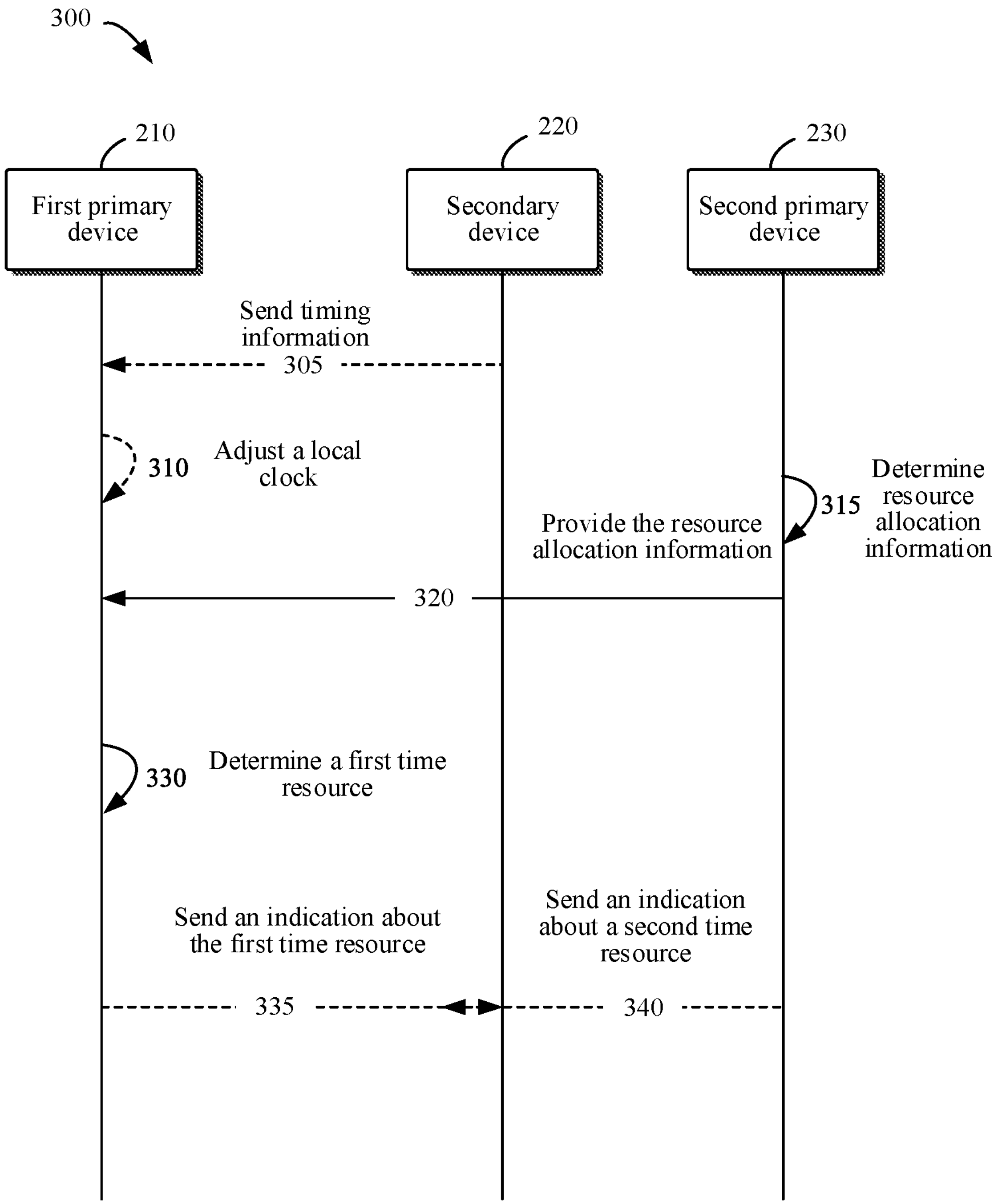
FIG. 3 is a signaling diagram of a resource negotiation process according to an embodiment of this application.

FIG. 3 is a signaling diagram of a resource negotiation process 300 according to an embodiment of this application. For description purposes only, the process 300 is described with reference to FIG. 2. The process 300 relates to the first primary device 210, the secondary device 220, and the second primary device 230 shown in FIG. 2. The secondary device 220 serving as a secondary node establishes a connection 201 with the first primary device 210, and establishes a connection 202 with the secondary device 220. For example, the secondary device 220 separately establishes a Bluetooth connection with the first primary device 210 and the second primary device 230.

By establishing the connections 201 and 202, the secondary device 220 may obtain clock information of the first primary device 210 and clock information of the second primary device 230, for example, a start of a slot. Correspondingly, in some embodiments, a clock of the first primary device 210 may be aligned with a clock of the second primary device 230. In the process 300, the secondary device 220 may send timing information related to the second primary device 230 to the first primary device 210 305. The timing information is used for aligning the clock of the first primary device 210 with the clock of the second primary device 230. That is, the secondary device 220 may request clock dragging from the first primary device 210. The timing information may be, for example, a slot offset of the first primary device 210 relative to the second primary device 230. In response to receiving the timing information, the first primary device 210 may adjust a local clock based on the timing information, to align with the clock of the second primary device 230 310. For example, the first primary device 210 may drag the local clock based on the slot offset.

In these embodiments, a slot alignment between two primary nodes is implemented. This can improve efficiency of resource negotiation between the primary nodes. In addition, the slot alignment may further improve utilization of an air interface resource.

In the process 300, the second primary device 230 determines resource allocation information 315. The resource allocation information indicates at least a time resource for transmission from the first primary device 210 or the second primary device 230 to the secondary device 220. For example, the resource allocation information may indicate one or more slots to be occupied when the first primary device 210 or the second primary device 230 sends data to the secondary device 220. In some embodiments, the resource allocation information may indicate a time resource for transmission from each primary device (including the first primary device 210 and the second primary device 220) configured to control the secondary device 220 to the secondary device 230. That is, the second primary device 230 may uniformly allocate time resources. Alternatively, in some embodiments, the resource allocation information indicates a time resource (also referred to as a "second time resource") for transmission from the second primary device 230 to the secondary device 220, and does not indicate a time resource used for another primary device.

The second primary device 230 provides the resource allocation information for the first primary device 210 320. It may be understood that, no communication exists between the first primary device 210 and the second primary device 230 at first, and therefore, the resource allocation information is provided by the secondary device 230. In some embodiments, a link between the first primary device 210 and the second primary device 230 may be established through the secondary device 230, and then the second primary device 230 may send the resource allocation information to the first primary device 210 through the link. In these embodiments, the first primary device 210 and the second primary device 230 directly perform resource negotiation through the link. Alternatively, in some embodiments, the resource allocation information may be forwarded to the first primary device 210 through the secondary device 230. In these embodiments, the first primary device 210 and the second primary device 230 perform resource negotiation through the secondary device 230.

The first primary device 210 determines, based on the received resource allocation information, a time resource (also referred to as a "first time resource") for transmission from the first primary device 210 to the secondary device 220 330. For example, the first primary device 210 determines one or more slots occupied when sending data to the secondary device 220. The first time resource determined in this way does not overlap the second time resource.

If the resource allocation information already indicates the first time resource, it can be ensured that the first time resource does not overlap the second time resource, because both the first time resource and the second time resource are allocated by the second primary device 230. If the resource allocation information indicates the second time resource but does not indicate the first time resource, the first primary device 210 may determine an idle time resource that does not overlap the second time resource. Then, the first primary device 210 may determine the first time resource from the idle time resource. For example, the resource allocation information may indicate a slot to be occupied when the second primary device 230 sends data to the secondary device 220. The first primary device 210 may select, from idle slots, a slot used for sending data to the secondary device 220.

Continue with the process 300. The first primary device 210 may send an indication about the first time resource to the secondary device 220 335. The second primary device 230 may send an indication about the second time resource to the secondary device 220 340. In this way, the secondary device 220 may receive data from the first primary device 210 on the first time resource, and receive data from the second primary device 230 on the second time resource that does not overlap the first time resource. For example, the secondary device 220 may receive data from the first primary device 210 on a first group of slots, and receive data from the second primary device 230 on a second group of slots that does not conflict with the first group of slots.

Figure 4:
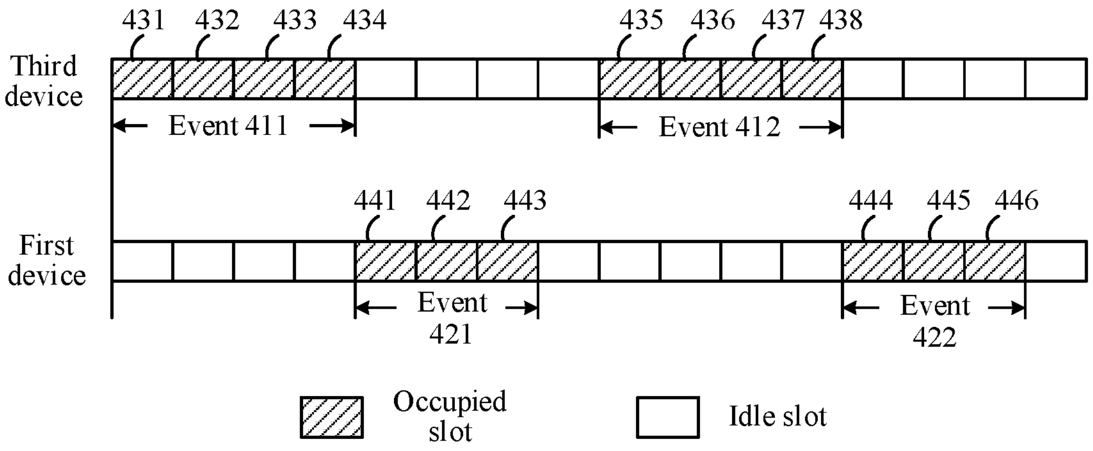
FIG. 4 shows an example of negotiated resource utilization according to some embodiments of this application.

Through the resource negotiation process shown in FIG. 3, a problem of an air interface resource conflict between the first primary device 210 and the second primary device 230 is resolved, thereby improving resource utilization. FIG. 4 shows an example of negotiated resource utilization according to some embodiments of this application. In the example in FIG. 4, slots of the first primary device 210 and slots of the second primary device 230 are aligned. Transmission from the second primary device 230 to the secondary device 220 includes an event 411 and an event 412. Transmission from the first primary device 210 to the secondary device 220 includes an event 421 and an event 422. After negotiation, the event 421 occupies slots between the event 411 and the event 412, and the event 422 occupies slots that follow the event 412. In this way, the transmission from the first primary device 210 to the secondary device 220 does not conflict with the transmission from the second primary device 230 to the secondary device 220.

It should be understood that, when the secondary device 220 is controlled by more than two primary nodes, the process 300 is applicable to another device that serves as a primary node. For example, the third primary device 240 shown in FIG. 2 may perform an operation similar to that of the first primary device 210. In this case, the clock of the first primary device 210, a clock of the third primary device 240, and a clock of another possible primary node are all aligned with the clock of the second primary device 230.

Example Process of Direct Negotiation

Figure 5:
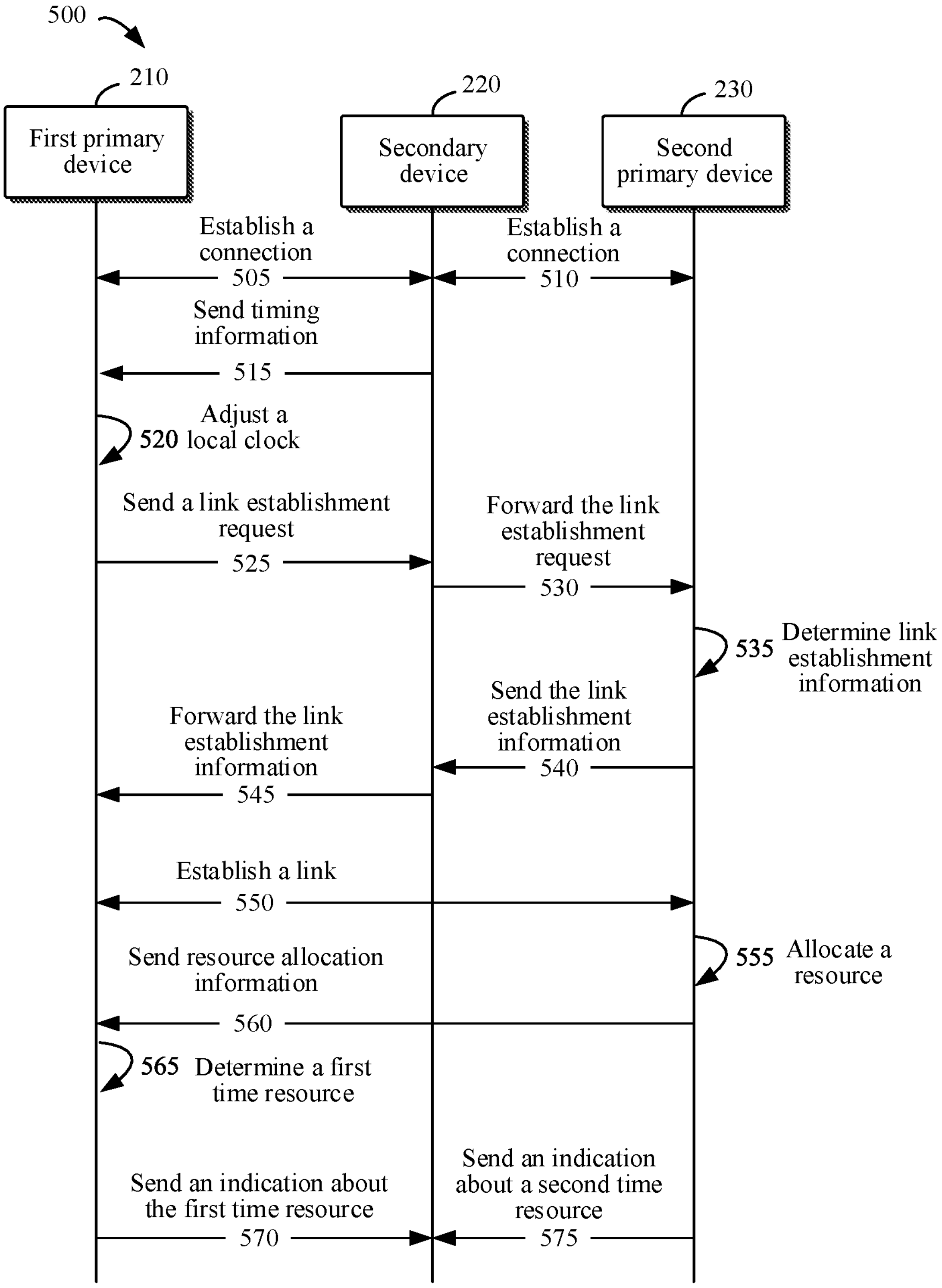
FIG. 5 is a signaling diagram of a resource negotiation process according to some embodiments of this application.

As mentioned above, in some embodiments, the primary nodes (for example, the first primary device 210 and the second primary device 230) may directly perform resource negotiation through the link. The following describes these embodiments with reference to FIG. 5. FIG. 5 is a signaling diagram of a resource negotiation process 500 according to some embodiments of this application. The process 500 may be considered as an example implementation of the process 300.

As shown in FIG. 5, the secondary device 220 establishes 505 the connection 201 with the first primary device 210. The secondary device 220 establishes 510 the connection 202 with the second primary device 230. By establishing the connections 201 and 202, the secondary device 220 may obtain clock information of the first primary device 210 and clock information of the second primary device 230, for example, a start of a slot. The secondary device 220 sends 515 timing information related to the second primary device 230 to the first primary device 210. The timing information is used for aligning the clock of the first primary device 210 with the clock of the second primary device 230. That is, the secondary device 220 requests clock dragging from the first primary device 210. The timing information may be, for example, a slot offset of the first primary device 210 relative to the second primary device 230.

The first primary device 210 adjusts 520 the local clock based on the timing information, to align with the clock of the second primary device 230. For example, the first primary device 210 may drag the local clock based on the slot offset, for example, increase or decrease a value of a clock register by the slot offset. In this way, the slot alignment between the two primary nodes is implemented. This can improve efficiency of resource negotiation between the primary nodes. In addition, the slot alignment may further improve utilization of an air interface resource.

Next, the first primary device 210 requests to establish the link with the second primary device 230 through the secondary device 220. Specifically, the first primary device 210 sends 525, to the secondary device 220, a request for establishing the link with the second primary device 230. The request is also referred to as a "link establishment request" or a "first request" in this specification. The secondary device 220 forwards 530 the link establishment request to the second primary device 230.

In response to the link establishment request, the second primary device 230 determines 535 link establishment information. The link establishment information may include various information required for establishing the link between the first primary device 210 and the second primary device 230. For example, the link establishment information may indicate a time-frequency resource, an encryption manner, and the like to be used by the second primary device 230 to send a message to the first primary device 210 in a link establishment process. The time-frequency resource may include the clock information of the second primary device 230, a frequency or a frequency band for sending a message, a time period for sending a message, and the like.

The second primary device 230 sends 540 the link establishment information to the secondary device 220. The secondary device 220 forwards 545 the link establishment information to the first primary device 210. After receiving the link establishment information, the first primary device 210 establishes 550 the link with the second primary device 230 based on the link establishment information. For example, the first primary device 210 may receive a message from the second primary device 230 by using the time-frequency resource indicated by the link establishment information, and decrypt the message by using the indicated encryption manner. Specifically, after the clock of the first primary device 210 is aligned with the clock of the second primary device 230, the first primary device 210 may receive a message from the second primary device 230 at the indicated frequency or frequency band within the indicated time period, to establish the link.

The first primary device 210 and the second primary device 230 may directly communicate with each other through the established link, to perform resource negotiation. In the example in FIG. 5, the second primary device 230 allocates 555 a resource to be occupied when each primary node sends data to the secondary device 220. Specifically, the second primary device 230 may allocate the first time resource for transmission from the first primary device 210 to the secondary device 220, and allocate the second time resource for transmission from the second primary device 230 to the secondary device 220. In this case, because both the first time resource and the second time resource are allocated by the second primary device 230, it can be ensured that the first time resource does not overlap the second time resource. For example, the second primary device 230 may allocate a slot to be occupied when the first primary device 210 sends data to the secondary device 220, and allocate a slot to be occupied when the second primary device 230 sends data to the secondary device 220. In the example in FIG. 4, slots 431 to 438 are allocated to the second primary device 230, and slots 441 to 446 that do not overlap the slots 431 to 438 are allocated to the first primary device 210.

The second primary device 230 sends 560 the resource allocation information to the first primary device 210 through the link. The resource allocation information may indicate at least the first time resource, for example, indicate the slots 441 to 446 shown in FIG. 4. The first primary device 210 determines 565 the indicated first time resource based on the resource allocation information. In this way, the first primary device 210 learns a time resource that should be used by the first primary device 210.

Continue with the process 500. The first primary device 210 sends 570 the indication about the first time resource to the secondary device 220. The second primary device 230 sends 575 the indication about the second time resource to the secondary device 220. In this way, the secondary device 220 may receive data from the first primary device 210 on the first time resource, and receive data from the second primary device 230 on the second time resource that does not overlap the first time resource. For example, the secondary device 220 may receive data from the first primary device 210 on the slots 431 to 438, and receive data from the second primary device 230 on the slots 441 to 446.

It should be understood that the process 500 shown in FIG. 5 is merely an example, and is not intended to limit the scope of this application. The process 500 may also be changed within the scope of this application. In the process 500, the second primary device 230 autonomously allocates the first time resource used for the first primary device 210. Alternatively, in some embodiments, the first primary device 210 may request a required time resource from the second primary device 230 through the established link. In this case, the second primary device 230 may allocate a resource based on a request of the first primary device 210.

In the process 500, the clock alignment between the first primary device 210 and the second primary device 230 occurs before the link is established. This facilitates quick establishment of the link between the first primary device 210 and the second primary device 230. Alternatively, in some embodiments, the clock alignment between the first primary device 210 and the second primary device 230 may occur during or after the link is established. For example, the first primary device 210 may perform clock dragging based on the clock of the second primary device 230 indicated by the link establishment information, to align with the clock of the second primary device 230.

In addition, when the secondary device 220 is controlled by more than two primary nodes, the process 500 is applicable to another device that serves as a primary node. In this case, another primary node other than the second primary device 230 establishes a link with the second primary device 230, and the second primary device 230 uniformly allocates time resources. For example, the third primary device 240 shown in FIG. 2 may perform an operation similar to that of the first primary device 210.

Example Process Negotiated Through the Secondary Node

Figure 6:
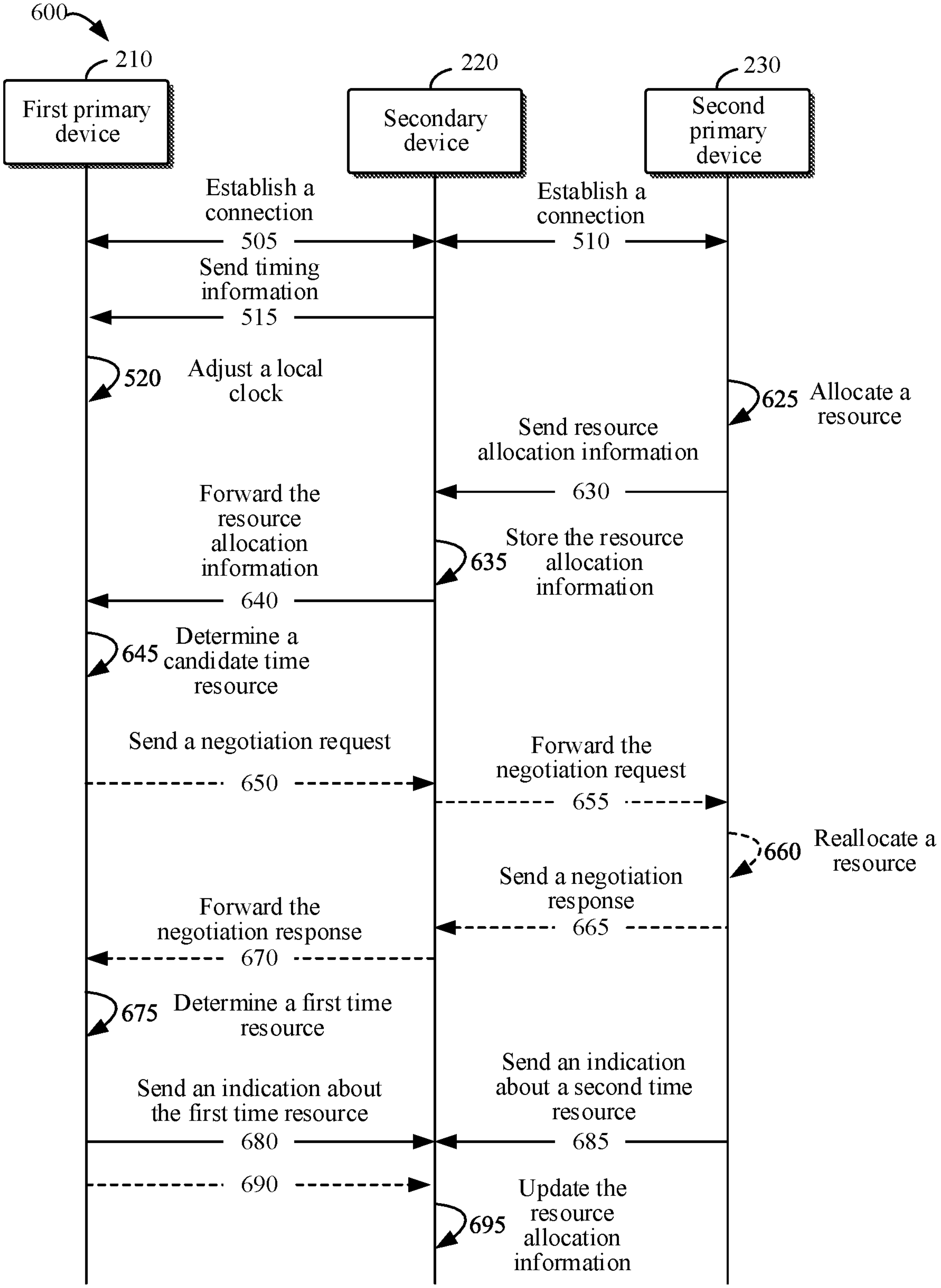
FIG. 6 is a signaling diagram of a resource negotiation process according to some other embodiments of this application.

As mentioned above, in some embodiments, the primary node may perform resource negotiation through the secondary node. The following describes these embodiments with reference to FIG. 6. FIG. 6 is a signaling diagram of a resource negotiation process 600 according to some embodiments of this application. The process 600 may be considered as another example implementation of the process 300. Actions in the process 600 that have same reference numerals as the process 500 are similar to those described with reference to FIG. 5, and therefore are not repeated.

The second primary device 230 allocates 625 a time resource for transmission from the second primary device 230 to the secondary device 220. The time resource is also referred to as a "second time resource". For example, the second primary device 230 may allocate slots to be occupied when the second primary device 230 sends data to the secondary device 220, for example, the slots 431 to 438 shown in FIG. 4. The second primary device 230 sends 630 the resource allocation information indicating the second time resource to the secondary device 220. After the connection 202 is established, the secondary device 220 may send a message to the second primary device 230, to enable the second primary device 230 to learn that the secondary device 220 is further controlled by another device. In this case, the second primary device 230 may send the resource allocation information to the secondary device 220. For example, the second primary device 230 may broadcast the resource allocation information to the secondary device 220.

The secondary device 220 locally stores 635 the received resource allocation information, and forwards 640 the resource allocation information to the first primary device 210. The secondary device 220 may autonomously forward the resource allocation information to the first primary device 210, or may forward the resource allocation information to the first primary device 210 in response to a request of the first primary device 210.

The first primary device 210 determines 645 the idle time resource based on the resource allocation information from the second primary device 230. The idle time resource does not overlap the second time resource allocated to the second primary device 230. For example, the first primary device 210 may determine an idle slot. Next, the first primary device 210 determines the first time resource based on the idle time resource, to send data to the secondary device 220.

In some embodiments, if the idle time resource is sufficient for transmission from the first primary device 210 to the secondary device 220, the first primary device 210 determines that the allocation is successful. The first primary device 210 selects the first time resource from the idle time resource. For example, if the idle slot is sufficient for the first primary device 210 to send data to the secondary device 220, the first primary device 210 selects, from the idle slot, a slot used for sending data to the secondary device 220.

In some embodiments, if the idle time resource is insufficient for transmission from the first primary device 210 to the secondary device 220, the first primary device 210 needs to perform further negotiation with the second primary device 230. As shown in FIG. 6, the first primary device 210 may send 650, to the secondary device 220, a request for resource negotiation with the second primary device 230. The request is also referred to as a "negotiation request" or a "second request". The negotiation request may include information such as a quantity of resources (for example, a quantity of required slots) required by the first primary device 210 and an event priority of to-be-sent data.

The secondary device 220 forwards 655 the negotiation request to the second primary device 230. The second primary device 230 determines, based on the received negotiation request, whether to reallocate resources. The second primary device 230 may determine, based on information such as the quantity of resources and the event priority in the negotiation request, whether to reallocate resources, and a quantity of resources to be reallocated, and the like. When it is determined to reallocate the resources, the second primary device 230 may reallocate 660 an additional time resource to the first primary device 210. For example, the second primary device 230 may use a part of the second time resource originally allocated to the second primary device 230 as an additional resource, and reallocate the additional resource to the first primary device 210. In this case, the second time resource for transmission from the second primary device 230 to the secondary device 220 is also updated.

The second primary device 230 may send 665 a response to the negotiation request to the secondary device 220. The response is also referred to as a "negotiation response". The secondary device 220 may forward 670 the negotiation response to the first primary device 210. When the second primary device 230 does not reallocate the resources, the negotiation response may indicate that the request of the first primary device 210 is rejected. In this case, the first primary device 210 may use the previously determined idle time resource as the first time resource, to send a part of data to the secondary device 220. Alternatively, the first primary device 210 may give up sending data to the secondary device 220.

When the second primary device 230 reallocates the resources, the negotiation response may indicate the additional time resource, for example, an additional slot, that is reallocated by the second primary device 230 to the first primary device 210. In this case, the first primary device 210 may determine 675 the first time resource based on a candidate time resource and the additional time resource.

The first primary device 210 sends 680 the indication about the first time resource to the secondary device 220. The second primary device 230 sends 685 the indication about the second time resource to the secondary device 220. It should be understood that, when the resources are reallocated, the indication is related to the updated second time resource. In this way, the secondary device 220 may receive data from the first primary device 210 on the first time resource, and receive data from the second primary device 230 on the second time resource that does not overlap the first time resource. For example, the secondary device 220 may receive data from the first primary device 210 on the slots 431 to 438, and receive data from the second primary device 230 on the slots 441 to 446.

The secondary device 220 updates 695 the stored resource allocation information, to indicate that the first time resource is occupied by the first primary device 210. In some embodiments, the secondary device 220 may update the resource allocation information based on the indication about the first time resource. Alternatively or additionally, in some embodiments, the first primary device 210 may send 690, to the secondary device 220, a message indicating that the first time resource is to be occupied. The secondary device 220 may update the resource allocation information based on the message. The message may be, for example, a dedicated message used for updating the resource allocation information. The update of the resource allocation information enables another primary node other than the first primary device 210 and the second primary device 230 to learn air interface resource allocation, to avoid a resource conflict.

It should be understood that the process 600 shown in FIG. 6 is merely an example, and is not intended to limit the scope of this application. The process 600 may also be changed within the scope of this application. In addition, when the secondary device 220 is controlled by more than two primary nodes, the process 600 is applicable to another device that serves as a primary node. In this case, clocks of other primary nodes other than the second primary device 230 are aligned with the clock of the second primary device 230, and all the other primary nodes perform resource negotiation with the second primary device 230 through the secondary device 220. For example, the third primary device 240 shown in FIG. 2 may perform an operation similar to that of the first primary device 210. The third primary device 240 may obtain, from the secondary device 220, resource allocation information indicating the first time resource and the second time resource, and determine a time resource that does not overlap the first time resource and the second time resource to send data to the secondary device 220.

Example Method, Apparatus, and Device

Figure 7:
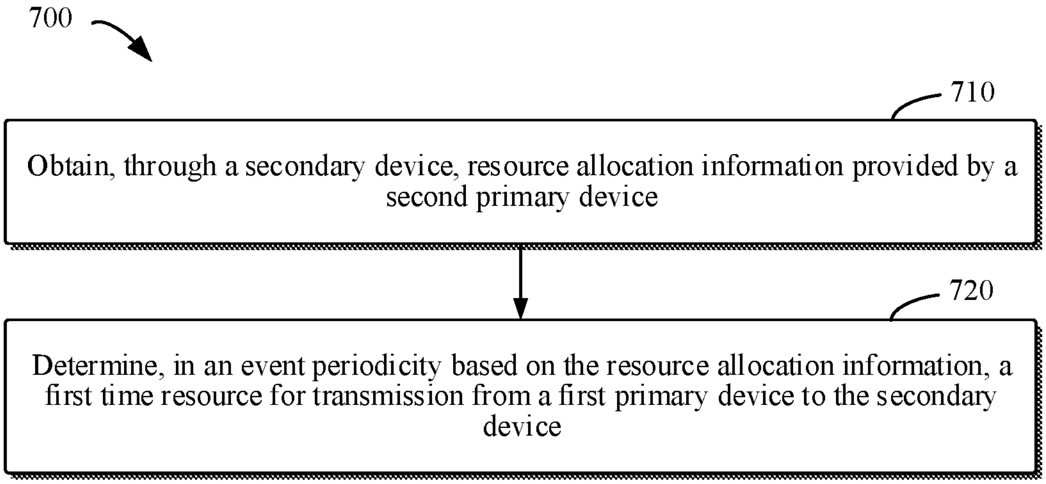
FIG. 7 is a flowchart of a resource negotiation method implemented by a first primary device according to some embodiments of this application.

FIG. 7 is a flowchart of a resource negotiation method 700 according to some embodiments of this application. The method 700 is applied to, for example, the multi-connectivity scenario shown in FIG. 2. In the multi-connectivity scenario, the first primary device 210 and the second primary device 230 separately control the secondary device 230. The method 700 may be implemented by the first primary device 210. For ease of description, the following describes the method 700 with reference to FIG. 2.

In block 710, the first primary device 210 obtains, through the secondary device 220, resource allocation information provided by the second primary device 230. The resource allocation information indicates at least a time resource for transmission from the first primary device 210 or the second primary device 230 to the secondary device 220. In block 720, the first primary device 210 determines, in an event periodicity based on the resource allocation information, a first time resource for transmission from the first primary device 210 to the secondary device 220.

In some embodiments, the obtaining resource allocation information includes: The first primary device 210 receives link establishment information from the secondary device 220, where the link establishment information is used for establishing a link between the first primary device 210 and the second primary device 230; the first primary device 210 establishes the link with the second primary device 230 based on the link establishment information; and the first primary device 210 receives the resource allocation information from the second primary device 230 through the link.

In some embodiments, the method 700 further includes: The first primary device 210 sends, to the secondary device 220, a first request used for establishing the link, to indicate the secondary device 220 to forward the first request to the second primary device 230.

In some embodiments, the obtaining resource allocation information includes: The first primary device 210 receives the resource allocation information obtained by the secondary device 220 from the second primary device 230 and forwarded by the secondary device 220.

In some embodiments, the resource allocation information indicates a second time resource for transmission from the second primary device 230 to the secondary device 220. The determining a first time resource includes: The first primary device 210 determines, in the event periodicity based on the second time resource, an idle time resource that does not overlap the second time resource; and the first primary device 210 determines the first time resource based on the idle time resource.

In some embodiments, the determining the first time resource based on the idle time resource includes: If the idle time resource is insufficient for transmission from the first primary device 210 to the secondary device 220, the first primary device 210 sends, to the secondary device 220, a second request for resource negotiation with the second primary device 230; the first primary device 210 receives a response to the second request from the secondary device 220, where the response indicates an additional time resource reallocated by the second primary device 230; and the first primary device 210 determines the first time resource based on the idle time resource and the additional time resource.

In some embodiments, the method 700 further includes: The first primary device 210 sends, to the secondary device 220, a message indicating that the first time resource is to be occupied, to update the resource allocation information stored in the secondary device 220.

In some embodiments, the method 700 further includes: The first primary device 210 receives timing information related to the second primary device 230 from the secondary device 220; and the first primary device 210 adjusts a local clock of the first primary device 210 based on the timing information, to align with a clock of the second primary device 230.

Figure 8:
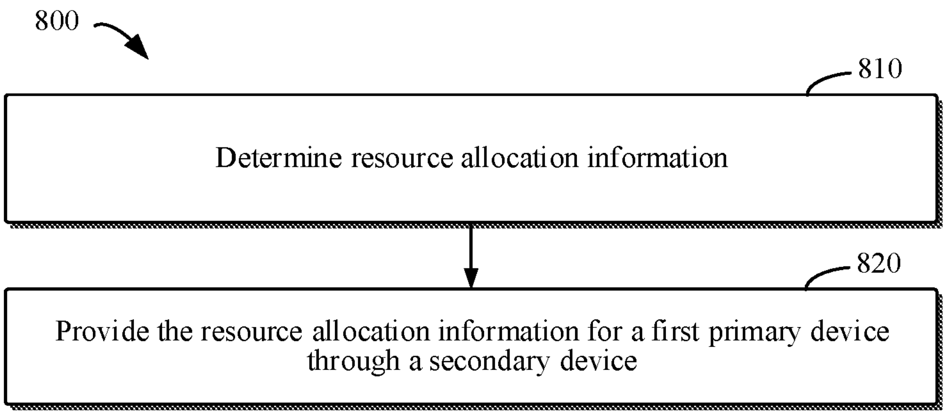
FIG. 8 is a flowchart of a resource negotiation method implemented by a second primary device according to some embodiments of this application.

FIG. 8 is a flowchart of a resource negotiation method 800 according to some embodiments of this application. The method 800 is applied to, for example, the multi-connectivity scenario shown in FIG. 2. In the multi-connectivity scenario, the first primary device 210 and the second primary device 230 separately control the secondary device 230. The method 800 may be implemented by the second primary device 230. For ease of description, the following describes the method 800 with reference to FIG. 2.

In block 810, the second primary device 230 determines resource allocation information. The resource allocation information indicates at least a time resource for transmission from the first primary device 210 or the second primary device 230 to the secondary device 220. In block 820, the second primary device 230 provides the resource allocation information for the first primary device 210 through the secondary device 220, to indicate the first primary device 210 to determine, in an event periodicity, a first time resource for transmission from the first primary device 210 to the secondary device 220.

In some embodiments, the providing the resource allocation information for the first primary device 210 includes: The second primary device 230 sends link establishment information to the secondary device 220, where the link establishment information is used for establishing a link between the first primary device 210 and the second primary device 230; the second primary device 230 establishes the link with the first primary device 210 based on the link establishment information; and the second primary device 230 sends the resource allocation information to the first primary device 210 through the link.

In some embodiments, the sending link establishment information to the secondary device 220 includes: The second primary device 230 receives a first request used for establishing the link from the secondary device 220; and in response to the first request, the second primary device 230 sends the link establishment information to the secondary device 220.

In some embodiments, the providing the resource allocation information for the first primary device 210 includes: sending the resource allocation information to the secondary device 220, to indicate the secondary device 220 to forward the resource allocation information to the first primary device 210.

In some embodiments, the resource allocation information indicates a second time resource for transmission from the second primary device 230 to the secondary device 220.

The method 800 further includes: The second primary device 230 receives, from the secondary device 220, a second request for resource negotiation with the second primary device 230; and the second primary device 230 sends a response to the second request to the secondary device 220, where the response indicates an additional time resource reallocated by the second primary device 230, to indicate the secondary device 220 to forward the additional time resource to the first primary device 210.

Figure 9:
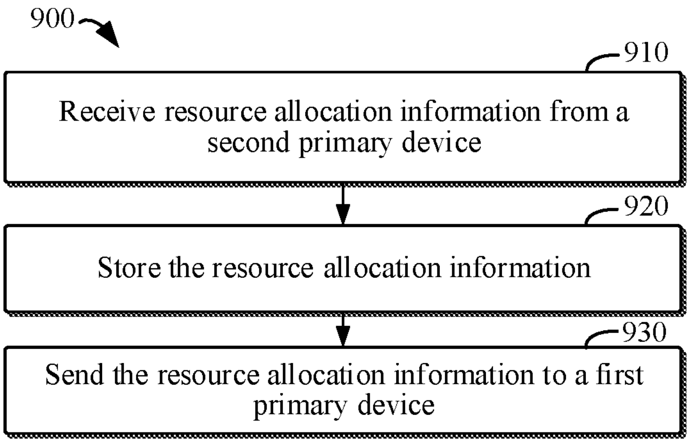
FIG. 9 is a flowchart of a resource negotiation method implemented by a secondary device according to some embodiments of this application.

FIG. 9 is a flowchart of a resource negotiation method implemented by a secondary device 220 according to some embodiments of this application. The method 900 is applied to, for example, the multi-connectivity scenario shown in FIG. 2. In the multi-connectivity scenario, the first primary device 210 and the second primary device 230 separately control the secondary device 230. The method 900 may be implemented by the secondary device 220 shown in FIG. 2. For ease of description, the following describes the method 900 with reference to FIG. 2.

In block 910, the secondary device 220 receives resource allocation information from the second primary device 230. The resource allocation information indicates at least a time resource for transmission from the first primary device 210 or the second primary device 230 to the secondary device 220. In block 920, the secondary device 220 stores the resource allocation information. In block 930, the secondary device 220 sends the resource allocation information to the first primary device 210, to indicate the first primary device 210 to determine, in an event periodicity, a first time resource for transmission from the first primary device 210 to the secondary device 220.

In some embodiments, the resource allocation information indicates a second time resource for transmission from the second primary device 230 to the secondary device 220. The method 900 further includes: The secondary device 220 receives, from the first primary device 210, a message indicating that the first time resource is to be occupied; and in response to receiving the message, the secondary device 220 updates the stored resource allocation information to indicate that the first time resource is occupied by the first primary device 210.

In some embodiments, the method 900 further includes: The secondary device 220 sends timing information related to the second primary device 230 to the first primary device 210, to enable a clock of the first primary device 210 to be aligned with a clock of the second primary device 230.

Figure 10:
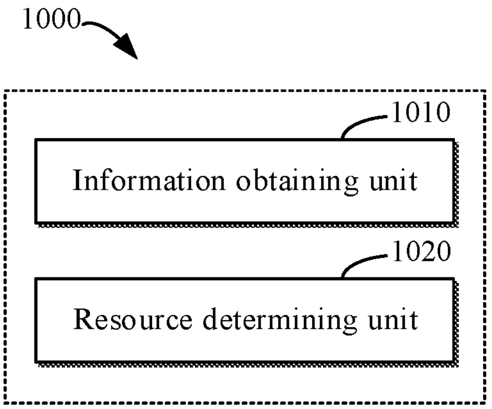
FIG. 10 is a schematic block diagram of a resource negotiation apparatus according to some embodiments of this application.

FIG. 10 is a schematic block diagram of a resource negotiation apparatus 1000 according to some embodiments of this application. The apparatus 1000 may be configured to implement the first primary device 210 shown in FIG. 2 or a part of the first primary device 210. As shown in FIG. 10, the apparatus 1000 includes an information obtaining unit 1010, configured to obtain, through a secondary device, resource allocation information provided by a second primary device, where the resource allocation information indicates at least a time resource for transmission from a first primary device or the second primary device to the secondary device. The apparatus 1000 further includes a resource determining unit 1020, configured to determine, in an event periodicity based on the resource allocation information, a first time resource for transmission from the first primary device to the secondary device.

In some embodiments, the information obtaining unit 1010 is further configured to: receive link establishment information from the secondary device, where the link establishment information is used for establishing a link between the first primary device and the second primary device; establish the link with the second primary device based on the link establishment information; and receive the resource allocation information from the second primary device through the link.

In some embodiments, the apparatus 1000 further includes: a first request sending unit, configured to send, to the secondary device, a first request used for establishing the link, to indicate the secondary device to forward the first request to the second primary device.

In some embodiments, the information obtaining unit 1010 is further configured to receive the resource allocation information obtained by the secondary device from the second primary device and forwarded by the secondary device.

In some embodiments, the resource allocation information indicates a second time resource for transmission from the second primary device to the secondary device. The resource determining unit 1020 is further configured to: determine, in the event periodicity based on the second time resource, an idle time resource that does not overlap the second time resource; and determine the first time resource based on the idle time resource.

In some embodiments, the resource determining unit 1020 is further configured to: If the idle time resource is insufficient for transmission from the first primary device to the secondary device, send, to the secondary device, a second request for resource negotiation with the second primary device; receive a response to the second request from the secondary device, where the response indicates an additional time resource reallocated by the second primary device; and determine the first time resource based on the idle time resource and the additional time resource.

In some embodiments, the apparatus 1000 further includes a message sending unit, configured to send, to the secondary device, a message indicating that the first time resource is to be occupied, to update the resource allocation information stored in the secondary device.

In some embodiments, the apparatus 1000 further includes: a timing information receiving unit, configured to receive timing information related to the second primary device from the secondary device; and a clock adjusting unit, configured to adjust a local clock of the first primary device based on the timing information, to align with a clock of the second primary device.

Figure 11:
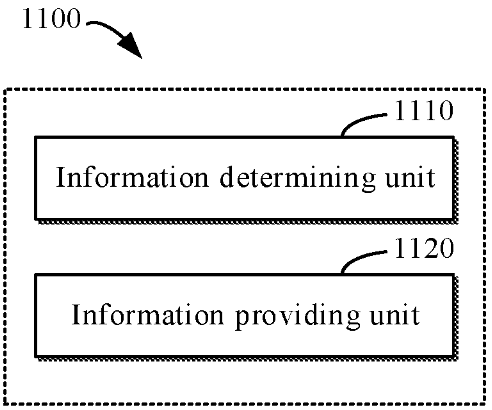
FIG. 11 is a schematic block diagram of a resource negotiation apparatus according to some embodiments of this application.

FIG. 11 is a schematic block diagram of a resource negotiation apparatus 1100 according to some embodiments of this application. The apparatus 1100 may be configured to implement the second primary device 230 shown in FIG. 2 or a part of the second primary device 230. As shown in FIG. 11, the apparatus 1100 includes: an information determining unit 1110, configured to determine resource allocation information, where the resource allocation information indicates at least a time resource for transmission from a first primary device or a second primary device to a secondary device; and an information providing unit 1120, configured to provide the resource allocation information for the first primary device through the secondary device, to indicate the first primary device to determine, in an event periodicity, a first time resource for transmission from the first primary device to the secondary device.

In some embodiments, the information providing unit 1120 is further configured to: send link establishment information to the secondary device, where the link establishment information is used for establishing a link between the first primary device and the second primary device; establish the link with the first primary device based on the link establishment information; and send the resource allocation information to the first primary device through the link.

In some embodiments, the information providing unit 1120 is further configured to: receive a first request used for establishing the link from the secondary device; and in response to the first request, send the link establishment information to the secondary device.

In some embodiments, the information providing unit 1120 is further configured to send the resource allocation information to the secondary device, to indicate the secondary device to forward the resource allocation information to the first primary device.

In some embodiments, the resource allocation information indicates a second time resource for transmission from the second primary device to the secondary device. The apparatus 1100 further includes: a second request receiving unit, configured to receive, from the secondary device, a second request for resource negotiation with the second primary device; and a responding unit, configured to send a response to the second request to the secondary device, where the response indicates an additional time resource reallocated by the second primary device 230, to indicate the secondary device to forward the additional time resource to the first primary device.

Figure 12:
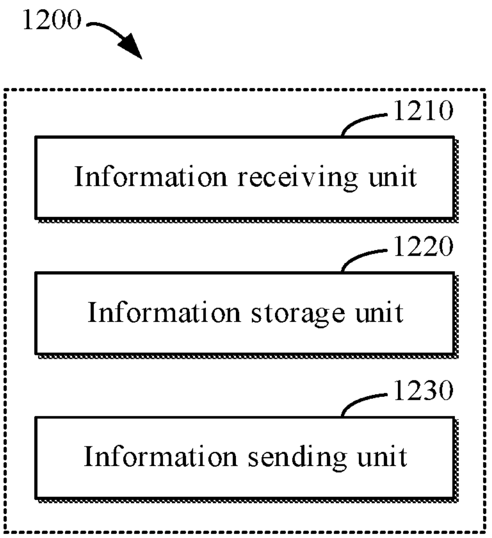
FIG. 12 is a schematic block diagram of a resource negotiation apparatus according to some embodiments of this application.

FIG. 12 is a schematic block diagram of a resource negotiation apparatus 1200 according to some embodiments of this application. The apparatus 1200 may be configured to implement the secondary device 220 shown in FIG. 2 or a part of the secondary device 220. As shown in FIG. 12, the apparatus 1200 includes an information receiving unit 1210, configured to receive resource allocation information from a second primary device, where the resource allocation information indicates at least a time resource for transmission from a first primary device or the second primary device to a secondary device. The apparatus 1200 further includes an information storage unit 1220, configured to store the resource allocation information. The apparatus 1200 further includes an information sending unit 1230, configured to send the resource allocation information to the first primary device, to indicate the first primary device to determine, in an event periodicity, a first time resource for transmission from the first primary device to the secondary device.

In some embodiments, the resource allocation information indicates a second time resource for transmission from the second primary device to the secondary device. The apparatus 1200 further includes: a message receiving unit, configured to receive, from the first primary device, a message indicating that the first time resource is to be occupied; and an information updating unit, configured to update, in response to receiving the message, the stored resource allocation information, to indicate that the first time resource is occupied by the first primary device.

In some embodiments, the apparatus 1200 further includes: a timing information sending unit, configured to send timing information related to the second primary device to the first primary device, to enable a clock of the first primary device to be aligned with a clock of the second primary device.

Figure 13:
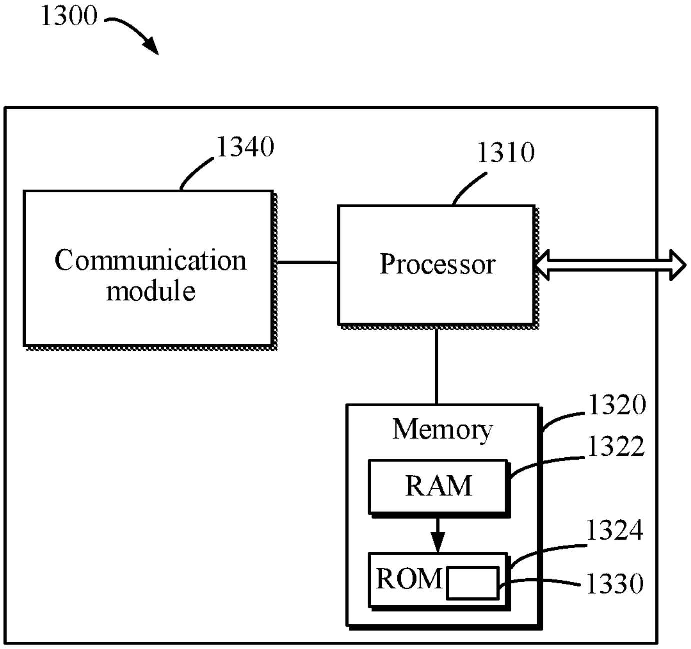
FIG. 13 is a schematic block diagram of a device that can implement a plurality of embodiments of this application.

FIG. 13 is a schematic block diagram of an example device 1300 that may be configured to implement embodiments of this application. The device 1300 may be implemented as or included in the first primary device 210, the second primary device 230, or the secondary device 220 in FIG. 2. As shown in the figure, the device 1300 includes one or more processors 1310, one or more memories 1320 coupled to the processor 1310, and a communication module 1340 coupled to the processor 1310.

The communication module 1340 may be configured to perform bidirectional communication. The communication module 1340 may have at least one communication interface for communication. The communication interface may include any interface necessary for communicating with another device.

The processor 1310 may be of any type suitable for a local technology network, and may include but is not limited to at least one of the following: a general-purpose computer, a dedicated computer, a microcontroller, a digital signal processor (DSP), or a controller-based multi-core controller architecture. The device 1300 may have a plurality of processors, such as application-specific integrated circuit chips, which in terms of time belong to a clock synchronized with a main processor.

The memory 1320 may include one or more non-volatile memories and one or more volatile memories. An example of the non-volatile memory includes but is not limited to at least one of the following: a read-only memory (ROM) 1324, an erasable programmable read-only memory (EPROM), a flash memory, a hard disk, a compact disc (CD), a digital versatile disc (DVD), or another magnetic storage and/or optical storage. An example of the volatile memory includes but is not limited to at least one of the following: a random access memory (RAM) 1322, or another volatile memory that does not last for power-off duration.

A computer program 1330 includes computer-executable instructions executed by the associated processor 1310. The program 1330 may be stored in the ROM 1324. The processor 1310 may perform any suitable action and processing by loading the program 1330 into the RAM 1322.

Embodiments of the present disclosure may be implemented by using the program 1330, to enable the device 1300 to perform any process discussed with reference to FIG. 7 to FIG. 9. Embodiments of the present disclosure may alternatively be implemented by using hardware or a combination of software and hardware.

The program 1330 may be tangibly included in a computer-readable medium, and the computer-readable medium may be included in the device 1300 (for example, in the memory 1320) or another storage device that may be accessed by the device 1300. The program 1330 may be loaded from the computer-readable medium to the RAM 1322 for execution. The computer-readable medium may include any type of tangible non-volatile memory, such as a ROM, an EPROM, a flash memory, a hard disk, a CD, or a DVD.

In some embodiments, the communication module 1340 in the device 1300 may be implemented as a transmitter and a receiver (or a transceiver), and may be configured to send/receive information such as first spatial relation information and second spatial relation information. In addition, the device 1300 may further include one or more of: a scheduler, a controller, and a radio frequency/an antenna. Details are not described in the present disclosure.

For example, the device 1300 in FIG. 13 may be implemented as an electronic device, or may be implemented as a chip or a chip system in an electronic device. This is not limited in embodiments of the present disclosure.

Embodiments of the present disclosure further provide a chip. The chip may include an input interface, an output interface, and a processing circuit. In embodiments of the present disclosure, the input interface and the output interface may complete exchange of signaling or data, and the processing circuit may complete generation and processing of signaling or data information.

Embodiments of the present disclosure further provide a chip system, including a processor, configured to support a computing device to implement a function in any one of the foregoing embodiments. In a possible design, the chip system may further include a memory, configured to store necessary program instructions and data. When the processor runs the program instructions, a device on which the chip system is installed is enabled to perform the method in any one of the foregoing embodiments. For example, the chip system may include one or more chips, or may include a chip and another discrete device.

Embodiments of the present disclosure further provide a processor, configured to be coupled to a memory. The memory stores instructions. When the processor runs the instructions, the processor is enabled to perform the method and the function in any one of the foregoing embodiments.

Embodiments of the present disclosure further provide a computer program product including instructions. When the computer program product runs on a computer, the computer is enabled to perform the method and the function in any one of the foregoing embodiments.

Embodiments of the present disclosure further provide a computer-readable storage medium, where the computer-readable storage medium stores computer instructions. When a processor runs the instructions, the processor is enabled to perform the method and the function in any one of the foregoing embodiments.

Generally, various embodiments of the present disclosure may be implemented by hardware or a dedicated circuit, software, logic, or any combination thereof. Some aspects may be implemented by hardware, and other aspects may be implemented by firmware or software, and may be performed by a controller, a microprocessor, or another computing device. Although aspects of embodiments of the present disclosure are shown and described as block diagrams, flowcharts, or other diagrams, it should be understood that the blocks, apparatuses, systems, technologies, or methods described in this specification may be implemented as, for example, non-limiting examples, hardware, software, firmware, dedicated circuits, logic, general-purpose hardware, controllers, other computing devices, or a combination thereof.

The present disclosure further provides at least one computer program product tangibly stored on a non-transitory computer-readable storage medium. The computer program product includes computer executable instructions, such as instructions included in a program module, which are executed in a device on a real or virtual processor of a target to perform the processes/methods as shown above with reference to the accompanying drawings. Generally, the program module includes a routine, a program, a library, an object, a class, a component, a data structure, and the like that execute a particular task or implement a particular abstract data type. In various embodiments, functions of program modules may be combined or a function of a program module may be split as needed. Machine-executable instructions for the program module may be executed locally or within a distributed device. In the distributed device, the program module may be located in local and remote storage media.

Computer program code used for implementing the methods disclosed in the present disclosure may be written in one or more programming languages. The computer program code may be provided for a processor of a general-purpose computer, a dedicated computer, or another programmable data processing apparatus, so that when the program code is executed by the computer or the another programmable data processing apparatus, functions/operations specified in the flowcharts and/or block diagrams are implemented. The program code may be executed all on a computer, partially on a computer, as an independent software package, partially on a computer and partially on a remote computer, or all on a remote computer or server.

In a context of the present disclosure, the computer program code or related data may be carried by any appropriate carrier, so that a device, an apparatus, or a processor can perform various processing and operations described above. Examples of the carrier include a signal, a computer-readable medium, and the like. For example, the signal may include propagating signals in electrical, optical, radio, sound, or other forms, such as carrier waves and infrared signals.

The computer-readable medium may be any tangible medium that includes or stores a program used for or related to an instruction execution system, apparatus, or device. The computer-readable medium may be a computer-readable signal medium or a computer-readable storage medium. The computer-readable medium may include but is not limited to an electronic, magnetic, optical, electromagnetic, infrared, or semiconductor system, apparatus, or device, or any suitable combination thereof. More detailed examples of the computer-readable storage medium include an electrical connection with one or more wires, a portable computer disk, a hard disk, a random access memory (RAM), a read-only memory (ROM), an erasable programmable read-only memory (EPROM or flash memory), an optical storage device, a magnetic storage device, or any suitable combination thereof.

In addition, although the operations of the methods disclosed in the present disclosure are described in a particular order in the accompanying drawings, this does not require or imply that these operations need to be performed in the particular order or that all of the shown operations need to be performed to achieve a desired result. Instead, execution orders of the steps depicted in the flowcharts may change. Additionally or alternatively, some steps may be omitted, a plurality of steps may be combined into one step for execution, and/or one step may be decomposed into a plurality of steps for execution. It should further be noted that features and functions of two or more apparatuses according to the present disclosure may be specified in one apparatus. On the contrary, features and functions of one apparatus described above may be further divided into a plurality of apparatuses for materialization.

The implementations of the present disclosure are described above. The foregoing descriptions are examples, are not exhaustive, and are not limited to the disclosed implementations. Many modifications and variations are apparent to a person of ordinary skill in the art without departing from the scope and spirit of the described implementations. Selection of terms used in this specification is intended to well explain implementation principles, actual application, or improvements to technologies in the market, or to enable another person of ordinary skill in the art to understand the implementations disclosed in this specification.

What is claimed is:

1. A method for resource negotiation, wherein the method is applied to a multi-connectivity scenario, and in the multi-connectivity scenario, a first primary device and a second primary device separately control a secondary device, and the method comprises:

obtaining, by the first primary device through the secondary device, resource allocation information provided by the second primary device, wherein the resource allocation information indicates at least a time resource for transmission from the first primary device or the second primary device to the secondary device; and determining, by the first primary device in an event periodicity based on the resource allocation information, a first time resource for transmission from the first primary device to the secondary device.

2. The method according to claim 1, wherein the obtaining resource allocation information comprises:

receiving, by the first primary device, link establishment information from the secondary device for establishing a link between the first primary device and the second primary device;

establishing, by the first primary device, the link with the second primary device based on the link establishment information; and receiving, by the first primary device, the resource allocation information from the second primary device through the link.

3. The method according to claim 2, wherein the method further comprises:

sending, by the first primary device to the secondary device, a first request for establishing the link, to indicate the secondary device to forward the first request to the second primary device.

4. The method according to claim 1, wherein the obtaining resource allocation information comprises:

receiving, by the first primary device, the resource allocation information obtained by the secondary device from the second primary device and forwarded by the secondary device.

5. The method according to claim 4, wherein the resource allocation information indicates a second time resource for transmission from the second primary device to the secondary device, and the determining a first time resource comprises:

determining, by the first primary device in the event periodicity based on the second time resource, an idle time resource that does not overlap the second time resource; and determining, by the first primary device, the first time resource based on the idle time resource.

6. The method according to claim 5, wherein the determining the first time resource based on the idle time resource comprises:

in response to determining that the idle time resource is insufficient for the transmission from the first primary device to the secondary device, sending, by the first primary device to the secondary device, a second request for resource negotiation with the second primary device;

receiving, by the first primary device, a response to the second request from the secondary device, wherein the response indicates an additional time resource reallocated by the second primary device; and determining, by the first primary device, the first time resource based on the idle time resource and the additional time resource.

7. The method according to claim 5, wherein the method further comprises:

sending, by the first primary device to the secondary device, a message indicating that the first time resource is to be occupied, to update the resource allocation information stored in the secondary device.

8. The method according to claim 1, wherein the method further comprises:

receiving, by the first primary device, timing information related to the second primary device from the secondary device; and adjusting, by the first primary device, a local clock of the first primary device based on the timing information, to align with a clock of the second primary device.

9. A method for resource negotiation, wherein the method is applied to a multi-connectivity scenario, and in the multi-connectivity scenario, a first primary device and a second primary device separately control a secondary device, and the method comprises:

determining, by the second primary device, resource allocation information, wherein the resource allocation information indicates at least a time resource for transmission from the first primary device or the second primary device to the secondary device; and providing, by the second primary device, the resource allocation information for the first primary device through the secondary device, to indicate the first primary device to determine, in an event periodicity, a first time resource for transmission from the first primary device to the secondary device.

10. The method according to claim 9, wherein the providing the resource allocation information for the first primary device comprises:

sending, by the second primary device, link establishment information to the secondary device for establishing a link between the first primary device and the second primary device;

establishing, by the second primary device, the link with the first primary device based on the link establishment information; and sending, by the second primary device, the resource allocation information to the first primary device through the link.

11. The method according to claim 10, wherein the sending link establishment information to the secondary device comprises:

receiving, by the second primary device from the secondary device, a first request for establishing the link; and in response to the first request, sending, by the second primary device, the link establishment information to the secondary device.

12. The method according to claim 9, wherein the providing the resource allocation information for the first primary device comprises:

sending the resource allocation information to the secondary device, to indicate the secondary device to forward the resource allocation information to the first primary device.

13. The method according to claim 12, wherein the resource allocation information indicates a second time resource for transmission from the second primary device to the secondary device, and the method further comprises:

receiving, by the second primary device from the secondary device, a second request for resource negotiation with the second primary device; and sending, by the second primary device, a response to the second request to the secondary device, wherein the response indicates an additional time resource reallocated by the second primary device, to indicate the secondary device to forward the additional time resource to the first primary device.

14. A apparatus for resource negotiation, wherein the apparatus either belongs to or is a first primary device in a multi-connectivity scenario, and in the multi-connectivity scenario, the first primary device and a second primary device separately control a secondary device, and the apparatus comprises at least one processor and at least one memory coupled to the at least one processor, wherein the at least one memory stores programming instructions for execution by the at least one processor to cause the apparatus to perform operations comprising:

obtaining, through the secondary device, resource allocation information provided by the second primary device, wherein the resource allocation information indicates at least a time resource for transmission from the first primary device or the second primary device to the secondary device; and determining, in an event periodicity based on the resource allocation information, a first time resource for transmission from the first primary device to the secondary device.

15. The apparatus according to claim 14, wherein the operations further comprise:

receiving link establishment information from the secondary device for establishing a link between the first primary device and the second primary device;

receiving the resource allocation information from the second primary device through the link; and establishing the link with the second primary device based on the link establishment information.

16. The apparatus according to claim 15, wherein the operations further comprise:

sending, to the secondary device, a first request for establishing the link, to indicate the secondary device to forward the first request to the second primary device.

17. The apparatus according to claim 14, wherein the operations further comprise:

receiving the resource allocation information obtained by the secondary device from the second primary device and forwarded by the secondary device.

18. The apparatus according to claim 17, wherein the resource allocation information indicates a second time resource for transmission from the second primary device to the secondary device, and the operations further comprise:

determining, in the event periodicity based on the second time resource indicated by the resource allocation information, an idle time resource that does not overlap the second time resource; and determining the first time resource based on the idle time resource.

19. The apparatus according to claim 18, wherein the operations further comprise:

in response to determining that the idle time resource is insufficient for the transmission from the first primary device to the secondary device, send, to the secondary device, a second request for resource negotiation with the second primary device;

receiving a response to the second request from the secondary device, wherein the response indicates an additional time resource reallocated by the second primary device; and determining the first time resource based on the idle time resource and the additional time resource.

20. The apparatus according to claim 18, wherein the operations further comprise:

sending, to the secondary device, a message indicating that the first time resource is to be occupied, to update the resource allocation information stored in the secondary device.

* * * * *